United States Patent
Kielwein

Patent Number: 5,562,259
Date of Patent: Oct. 8, 1996

[54] INERTIAL SENSOR

[75] Inventor: Thomas Kielwein, Eschach, Germany

[73] Assignee: TRW Repa GmbH, Aldorf, Germany

[21] Appl. No.: 386,380

[22] Filed: Feb. 10, 1995

[30] Foreign Application Priority Data

Feb. 11, 1994 [DE] Germany .................. 9402320 U

[51] Int. Cl.$^6$ .................................................. B60R 22/40
[52] U.S. Cl. ........................................................ 242/384.6
[58] Field of Search .............................. 242/384, 384.6;
280/806; 297/478

[56] References Cited

U.S. PATENT DOCUMENTS

| 3,901,461 | 8/1975 | Stephenson et al. | |
|---|---|---|---|
| 4,063,695 | 12/1977 | Oshikawa. | |
| 4,077,584 | 3/1978 | Lafont | 242/384.6 |
| 4,148,447 | 4/1979 | Lindblad | 242/384.6 |
| 4,467,981 | 8/1984 | Mori et al. | |
| 4,844,374 | 7/1989 | Mori. | |
| 4,934,626 | 6/1990 | Kimura | 242/384.6 |
| 4,936,601 | 6/1990 | Tada. | |
| 5,050,815 | 9/1991 | Doty et al. | 242/384.6 |
| 5,289,986 | 3/1994 | Hoshihara. | |

FOREIGN PATENT DOCUMENTS

| 0078204 | 5/1983 | European Pat. Off. . | |
|---|---|---|---|
| 0351551 | 1/1990 | European Pat. Off. . | |
| 52-20524 | 2/1977 | Japan | 297/478 |
| 2010071 | 6/1979 | United Kingdom . | |

Primary Examiner—John P. Darling
Attorney, Agent, or Firm—Tarolli, Sundheim, Covell, Tummino & Szabo

[57] ABSTRACT

An inertial sensor for the vehicle sensitive triggering of a locking mechanism on a belt retractor comprises a ball which is seated in a socket in alignment with a reference plane. A pivotally mounted sensor lever rests on the ball and has a free end with a control pawl formed thereon. The sensor lever is formed and adapted for cooperation with an externally toothed control disk of the belt retractor. The pivot axis of the sensor lever is inclined in relation to the reference plane in the same direction as the plane of the control disk, the angle of inclination of the pivot axis of the sensor lever being approximately half as large as the angle of inclination of the plane of the control disk in relation to a plane perpendicular to the reference plane.

2 Claims, 2 Drawing Sheets

INERTIAL SENSOR

BACKGROUND OF THE INVENTION

The invention relates to an inertial sensor for the vehicle sensitive triggering of a locking mechanism on a belt retractor, comprising a ball, which is seated in a socket in alignment with a reference plane, and a pivotally mounted sensor lever which rests on the ball, has a free end with a pawl formed thereon and is adapted for cooperation with an externally toothed control disk of the belt retractor.

Such an inertial sensor is adapted to respond to deceleration and acceleration of a vehicle and furthermore, however, to an oblique setting of the vehicle body in relation to the horizontal. The normal reference plane of the socket, in which the ball rests, is horizontal. If the ball is displaced in its socket, it will thrust the sensor lever upward toward the external teeth of the control disk on the belt retractor. To render it possible for the pawl on the free end of the control pawl to engage the teeth of the control disk, it is necessary for the sensor lever to move through a stroke with a predetermined size. Normally the direction of the stroke is in the plane of the control disk, that is to say in a vertical plane.

In many cases however the belt retractor is installed in the vehicle in an inclined setting. Since the resting plane for the ball of the inertial sensor must still be horizontal, the entire inertial sensor is arranged in a correspondingly inclined position in relation to belt retractor. The plane of the control disk is then not vertical but rather inclined in relation to a vertical plane. The direction of the stroke of the sensor lever is in this case not in the plane of the control disk. For the operation of the control pawl to en- gage the teeth of the control disk a larger stroke is required. Such larger stroke of the control pawl however means not only a greater space for the accommodation thereof but also more especially a longer response time until the locking operation is commenced. Such disadvantages can be overcome by a design of the control disk with oblique teeth. For different angles of inclination of the belt retractor it is necessary to provide a correspondingly large number of customized designs of the control disk. This leads to increased manufacturing complexity and higher costs of production.

SUMMARY OF THE INVENTION

An object of the invention is to provide an inertial sensor with which despite an inclined position of mounting of the belt retractor the use of a conventional control disk is possible without the need for a larger space for the accommodation thereof or without having a less satisfactory response characteristic.

In accordance with the invention the pivot axis of the sensor lever is inclined in relation to reference plane in the same direction as the plane of the control disk. The stroke of the sensor lever consequently takes place with a larger component directed toward the external teeth of the control disk. For the part resting thereon of the sensor lever the ball functions as a ramp, by which this stroke component is increased. The angle of inclination of the pivot axis of the sensor lever may in this respect be smaller than the angle of inclination of the control disk in relation to the vertical. A suitable value for the angle of inclination of the pivot axis can be determined empirically, particular attention being paid to the problem of friction between the ball surface and the engagement surface of the sensor lever. In the case of a large angle of inclination of the control disk of for example 45° or thereover the angle of inclination of the pivot axis of the sensor lever will be preferably selected to be approximately half the size of the angle of inclination of the control disk.

BRIEF DESCRIPTION OF THE DRAWING

One embodiment of the invention is depicted in the accompanying drawing.

DESCRIPTION OF THE PREFERRED EMBODIMENT

Figure 1:
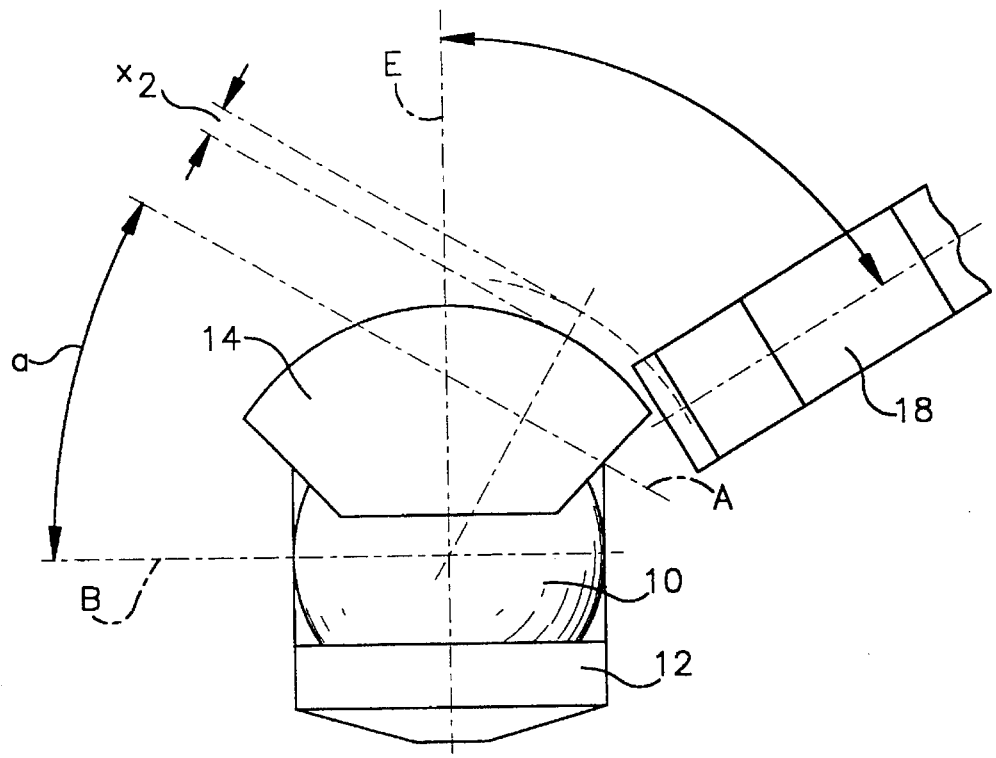
FIG. 1 diagrammatically shows the inertial sensor in an end-on view of a control disk which is inclined at a large angle in relation to the vertical.

In the case of the design depicted in FIG. 1 of the inertial sensor a ball 10 of metal rests on a socket 12 secured to the housing of a belt retractor (not illustrated), such socket extending in parallelism to a horizontal reference plane B. On the top of the ball there rests a sensor lever 14, which at its one end is pivoted for swinging motion about an axis A fixed in relation to the housing and at its other, free end bears a control pawl 16. In the neutral position of the inertial sensor the tip of the control pawl 16 is at a small clearance from the periphery of a control disk 18, whose external gearing means is constituted by peripherally spaced, pointed control teeth 20.

The plane of the control disk 18 is inclined in relation to a plane E, which is perpendicular to the reference plane B, by a relatively large angle of over 45°. The pivot axis A of the sensor lever is slanted in the same direction. The angle of inclination of the pivot axis A in relation to the reference plane B is indicated as α in FIG. 1.

For the following description of the manner of operation of the inertial sensor in accordance with the invention reference will be had to FIGS. 2 through 5, which indicate the problems in connection with a conventional inertial sensor.

Figure 2:
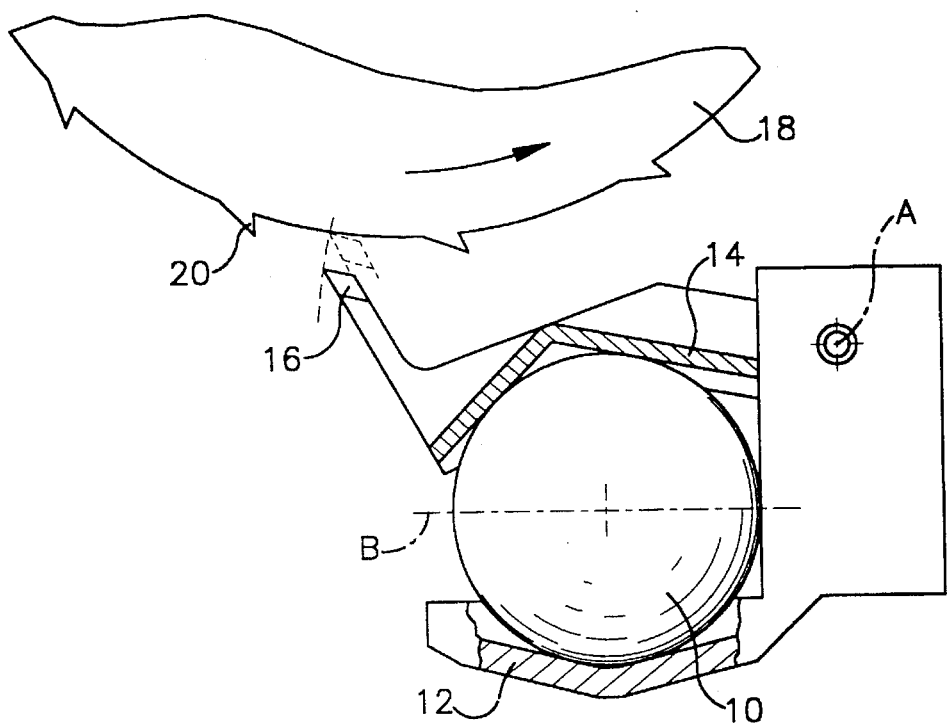
FIG. 2 is a diagrammatic lateral elevation of a conventional inertial sensor in cooperation with a control disk.

In FIG. 2 the pivot axis A of the sensor lever 14 is arranged to be parallel to the reference plane B. The stroke of the sensor lever 14 caused by a movement of the ball 10 in the socket or dish 12 and consequently of the control pawl 16 moves the latter into the path of the motion of the control teeth 16 on the control disk 18 so that the rotation thereof (see arrow in FIG. 2) is arrested. The relative rotation between the control disk 18 and the belt drum leads in customary fashion to tripping of the locking mechanism of the belt retractor.

Figure 3:
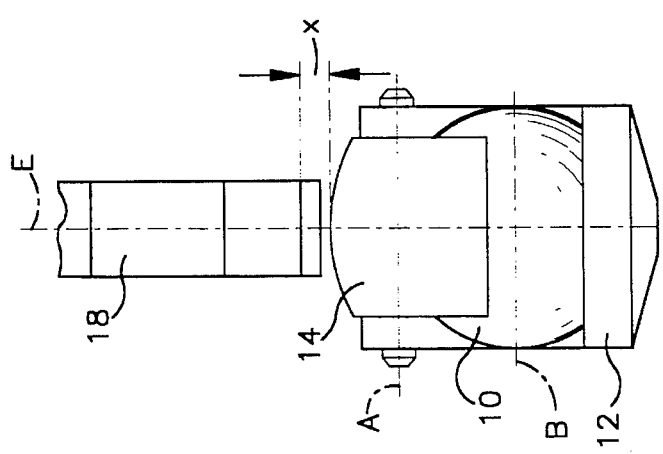
FIG. 3 shows an end-on elevation of conventional inertial sensor with the control disk aligned vertically.

FIG. 3 illustrates the conventional vertical arrangement of the control disk 18 in the case of a horizontal alignment of the pivot axis A of the sensor lever 14. The stroke of the control pawl for engagement with the external teeth of the control disk 18 is indicated as x.

Figure 4:
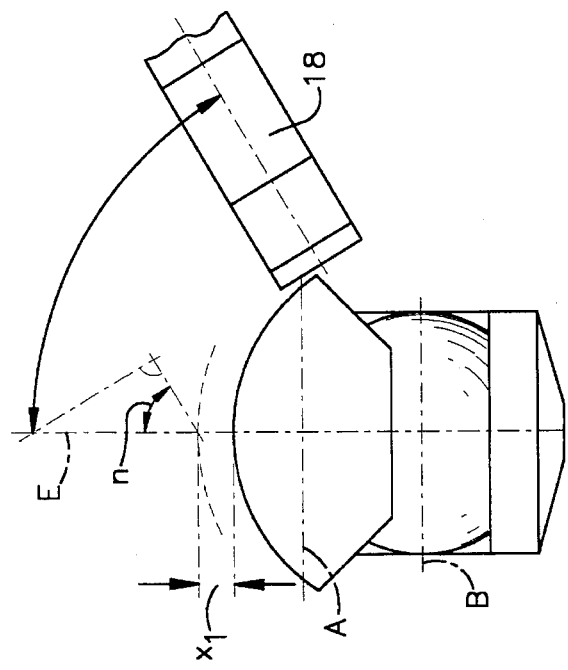
FIG. 4 is an end-on elevation of a conventional inertial sensor with the control disk inclined at a substantial angle.

If, on the contrary, as shown in FIG. 4, the control disk 18 is inclined at a great angle in relation to the plane E perpendicular to the reference plane B, for example one of more than 45°, a substantially increased stroke $x_1$ of the control pawl is required in order to come into engagement with the external teeth of the control disk 18. As may be proved with a process of simple geometrical reasoning, the stroke component parallel to the plane of the control disk 18 varies in relation to stroke component, which lies in the vertical plane E, of the control pawl, as the cosine of the angle β between this vertical plane E and the plane of the control disk 18. The necessary stroke $x_1$ is hence substantially larger than the stroke x in the case of a vertical alignment of the control disk 18.

Figure 5:
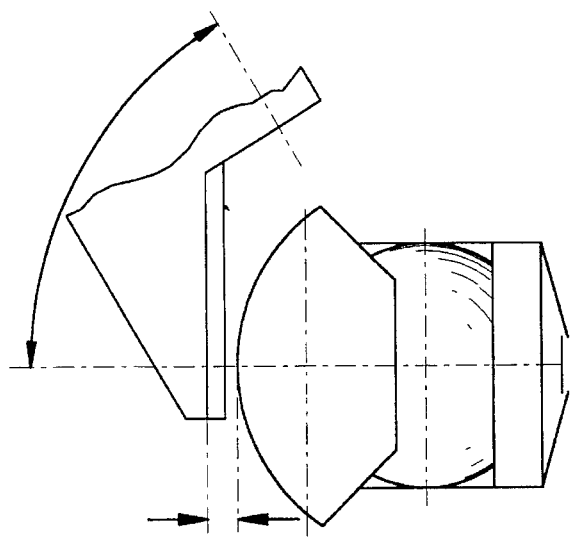
FIG. 5 is an end-on elevation of a conventional inertial sensor showing a customized design of a control disk.

In order to avoid an increase in the necessary stroke of the control the control disk may be provided with customized teeth on its outer periphery, such teeth being parallel to the reference plane B as illustrated in FIG. 5. This however means that as initially explained, a customized design of the control disk.

On comparing the design of the inertial sensor depicted in FIG. 1 with the situation shown in FIG. 4, it will become clear that owing to the inclined alignment of the pivot axis A of the sensor lever 14 its stroke $x_2$ required for the engagement of the control pawl with the external teeth of the control disk 18 will be substantially smaller in size. In principle it may be said that owing to the ramp effect between the surface of the ball 10 and the part resting thereon of the sensor lever 14 a stroke may be produced which is not larger in size than with a vertical arrangement as opposed to control disk 18 (FIG. 3); since however with the inclination of the pivot axis of the sensor lever there is additional friction between the engaging part thereof and the surface of the ball, a compromise solution must be sought.

What is claimed is:

1. An inertial sensor for vehicle sensitive triggering of a blocking mechanism on a safety belt retractor, comprising a socket, aligned with a reference plane, a ball seated in said socket, and a sensor lever which is pivotally mounted and bears by gravity on said ball, said sensor lever having a free end forming a pawl for cooperation with an externally toothed control disk on said belt retractor, and said sensor lever having a pivot axis inclined by an angle which is approximately half of an angle of inclination of said control disk in relation to a plane perpendicular to said reference plane.

2. An inertial sensor as set forth in claim 1, wherein said angle of inclination of said control disk in relation to said plane perpendicular to said reference plane is greater than 45°.

* * * * *